(12) United States Patent
Koetz et al.

(10) Patent No.: US 10,048,135 B2
(45) Date of Patent: Aug. 14, 2018

(54) METHOD FOR MEASURING A TEMPERATURE INSIDE A KITCHEN APPLIANCE

(71) Applicant: Vorwerk & Co. Interholding GmbH, Wuppertal (DE)

(72) Inventors: Hendrik Koetz, Wetter (DE); Christopher Fricke, Wuppertal (DE); Stefan Hilgers, Essen (DE); Maximilian Koennings, Zurich (DE); Arno Koch, Wollerau (CH); Maria Resende, Wollerau (CH); Georg Hackert, Bochum (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 225 days.

(21) Appl. No.: 15/042,209

(22) Filed: Feb. 12, 2016

(65) Prior Publication Data
US 2016/0238459 A1  Aug. 18, 2016

(30) Foreign Application Priority Data
Feb. 13, 2015 (EP) .................................... 15154990

(51) Int. Cl.
*G01K 1/02* (2006.01)
*G01K 11/26* (2006.01)
*A47J 36/32* (2006.01)

(52) U.S. Cl.
CPC ............. *G01K 1/024* (2013.01); *A47J 36/32* (2013.01); *G01K 11/265* (2013.01); *G01K 2207/06* (2013.01)

(58) Field of Classification Search
CPC ................................ G01K 11/22; G01K 1/024
See application file for complete search history.

(56) References Cited

U.S. PATENT DOCUMENTS

| 5,951,900 A * | 9/1999 | Smrke ..................... A47J 27/62 219/431 |
| 6,378,315 B1 * | 4/2002 | Gelber .................... F25D 29/00 236/51 |

(Continued)

FOREIGN PATENT DOCUMENTS

| DE | 10 2004 013 621 A1 | 10/2005 |
| DE | 10 2005 015 028 A1 | 10/2006 |

*Primary Examiner* — Clayton E Laballe
*Assistant Examiner* — Leon W Rhodes, Jr.
(74) *Attorney, Agent, or Firm* — Collard & Roe, P.C.

(57) ABSTRACT

The invention relates to a method for measuring a temperature inside a kitchen appliance (1), in particular of a temperature of an item to be cooked of an item to be cooked (21), which is to be prepared inside a kitchen appliance (1), comprising the method steps: transmitting an electromagnetic excitation signal by means of a transmission-receiving device (2), receiving the excitation signal by a temperature sensor (3), which is arranged in the kitchen appliance (1), in particular in the item to be cooked (21), transmitting a temperature-dependent response signal by the temperature sensor (3), receiving the response signal by the transmission-receiving device (2), determining the current temperature by comparing the response signal to temperature-dependent reference signals. To also provide for an interaction between a plurality of kitchen appliances (1, 4), it is proposed for the transmission-receiving device (2) to transmit the response signal or partial information of the response signal and/or the value of a current temperature, which is determined by means of the transmission-receiving device (2), to a control device of a further kitchen appliance (4) or to an external processor (5). In addition, a system for carrying out a method according to the invention is proposed.

10 Claims, 9 Drawing Sheets

(56) References Cited

U.S. PATENT DOCUMENTS

Figure 1:
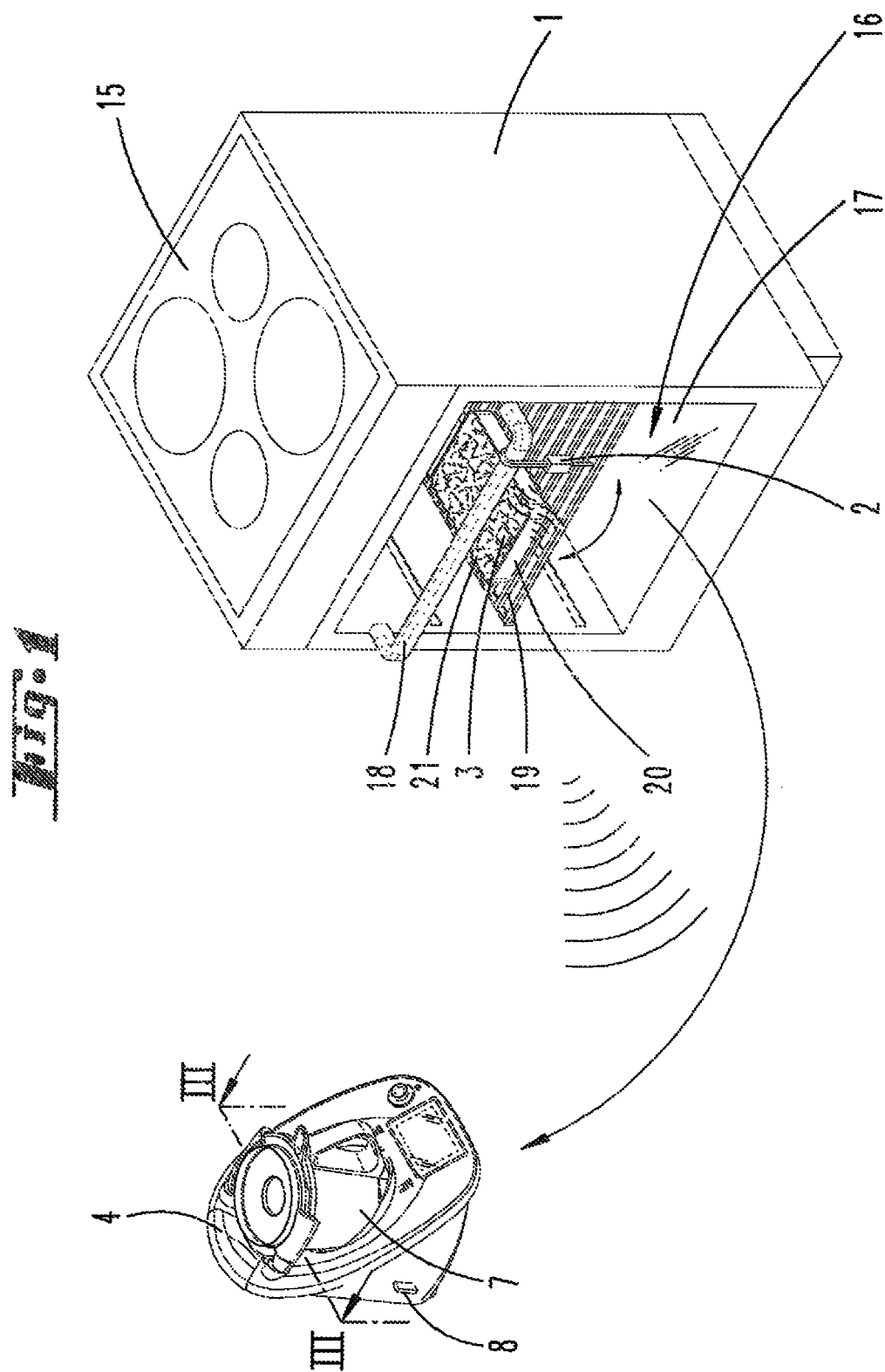

| | | | | |
|---|---|---|---|---|
| 7,019,638 | B1* | 3/2006 | Wallace | G01K 1/024 340/531 |
| 7,128,466 | B2* | 10/2006 | Chang | F24C 7/08 374/141 |
| 7,358,464 | B2 | 4/2008 | Beier et al. | |
| 8,275,566 | B2* | 9/2012 | Kobayashi | G01K 3/10 374/102 |
| 8,931,400 | B1* | 1/2015 | Allen | H04Q 9/00 340/870.09 |
| 2014/0098835 | A1* | 4/2014 | Herzog | G01K 11/265 374/117 |
| 2015/0147441 | A1* | 5/2015 | Lagerlof | A47J 27/62 426/231 |
| 2015/0234372 | A1* | 8/2015 | Slupik | G05B 15/02 700/275 |

\* cited by examiner

METHOD FOR MEASURING A TEMPERATURE INSIDE A KITCHEN APPLIANCE

CROSS REFERENCE TO RELATED APPLICATIONS

Applicant claims priority under 35 U.S.C. § 119 of European Application No. 15154990.4 filed on Feb. 13, 2015, the disclosure of which is incorporated by reference.

The invention relates to a method as well as to a system for measuring a temperature inside a kitchen appliance, in particular of a temperature of an item to be cooked of an item to be cooked, which is to be prepared inside a kitchen appliance, comprising the method steps: transmitting an electromagnetic excitation signal by means of a transmission-receiving device, receiving the excitation signal by a temperature sensor, which is arranged in the kitchen appliance, in particular in the item to be cooked, transmitting a temperature-dependent response signal by the temperature sensor, receiving the response signal by the transmission-receiving device, and determining the current temperature by comparing the response signal to temperature-dependent reference signals.

Measuring methods of the afore-mentioned type are known in the prior art. There are measuring methods, in the case of which the transmission of the excitation signal or of the response signal, respectively, occurs in a wired manner, as well as measuring methods, in the case of which the transmission occurs wirelessly, for example via radio.

The wired measuring methods include methods, for example, which utilize wired temperature probes, such as thermocouple elements or thermistors. These measuring methods are known, for example for measuring temperatures inside an oven. It is disadvantageous thereby that the temperature probe is installed in the oven and that the wire must be guided through the seals of the kitchen appliance. On the one hand, this is extensive with regard to production and, on the other hand, it is uncomfortable for the user of the kitchen appliance.

In addition, wireless measuring methods are known. A wireless temperature sensor based on surface waves, for example, is known from DE 10 2005 015 028 A1. For measuring a temperature, surface wave components are excited to vibrate by means of high-frequency electromagnetic waves, wherein a conclusion can be drawn to the temperature of the item to be cooked based on the temperature dependency of the electromagnetic waves, which are returned by the surface wave components. The high-frequency electromagnetic signals are transmitted to the temperature sensor by means of a transmission-receiving device. The waves, which are returned by the temperature sensor as response signal, are received by the transmission-receiving device and are transferred to an evaluation system. To be able to draw a conclusion, which is as accurate as possible, to the temperature of the item to be cooked from the received signals, a defined frequency band is passed through for each temperature measurement, thus for each measurement cycle. The resonance frequency can then be determined by means of the frequency-dependent signal intensities of the received response signals, and a conclusion can in turn be drawn therefrom to the temperature of the item to be cooked. The temperature of the item to be cooked is subsequently either displayed on a display of the oven, or is used to regulate a cooking process inside the oven. It is disadvantageous thereby that the measurement result is only available to the oven itself.

It is thus the object of the invention to create a method as well as a system for measuring a temperature inside a kitchen appliance, which is not only limited to a single kitchen appliance, but which also provides for an interaction between a plurality of kitchen appliances. In addition, the system is to be capable of being manufactured and used in a comfortable manner.

As solution, a method is created initially, in the case of which the transmission-receiving device transmits the response signal or partial information of the response signal and/or the value of a current temperature, which is determined by means of the transmission-receiving device, to a control device of a further kitchen appliance or to an external processor.

According to the invention, the response signal or the current temperature determined from the response signal is not used or is not used to regulate the coking process, respectively, inside the same kitchen appliance, but is instead provided to one or also to a plurality of further kitchen appliances for further use. For example, a temperature measured inside a first kitchen appliance, for example an oven, can thus be provided to a second kitchen appliance, for example of an electric cooking mixer, so that a method step is effected in the second kitchen appliance as a function of the current temperature of an item to be cooked, which is located in the first kitchen appliance. In response to reaching a certain temperature of an item to be cooked, for example, a heating device of the second kitchen appliance can be activated, so as to preheat a preparation vessel, which is needed at a later point in time. A plurality of kitchen appliances can thus be controlled so as to be coordinated with one another such that a total preparation time, which is as short as possible, is created for preparing a food. Likewise, preparation processes can thus be controlled in a fully-automatic manner, even if they are carried out by means of different kitchen appliances. As a whole, the preparation of a food can thus be carried out in a manner, which is particularly simple, time-saving and comfortable for the user.

In the alternative or also in addition, provision can be made for the measured current temperature to be displayed on a display of the first kitchen appliance, of the further kitchen appliance, or of an external processor. For example, the external processor can be a processor of a mobile end device, such as of a laptop or of a smartphone.

According to an alternative, the current temperature, the response signal or also only partial information of the response signal is not transmitted directly to a further kitchen appliance, but rather exclusively to the external processor or first to the external processor and then from this processor—either edited or unedited—to a further kitchen appliance.

According to the invention, the transmission-receiving device can transmit different information. On the one hand, said transmission-receiving device can directly transmit the response signal received from the temperature sensor or also only partial information, of this response signal to the further kitchen appliance or the external processor. In this case, the evaluation of the response signal or of the partial information respectively, is not made by the transmission-receiving device, but by the further kitchen appliance or by the external processor. The partial information of the response signal can thereby be all of the measured signal intensities with corresponding frequencies, for example, or also an information relating to the frequency of a response signal having the highest intensity. In the alternative, however, it is also possible for the transmission-receiving device to already carry out the evaluation and to only transmit the result, that is, the determined current temperature, to the further kitchen appliance or to the external processor.

The invention is not limited to measuring methods, which work on the basis of surface waves. In fact, the temperature can also be measured by means of other electromagnetic measuring methods, in the case of which an excitation signal is transmitted by the transmission-receiving device, a temperature sensor arranged in the kitchen appliance or in the item to be cooked, respectively, receives the excitation signal and then transmits a temperature-dependent response signal. The determination of the current temperature thereby always occurs as proposed by means of comparing the response signal received by the transmission-receiving device with temperature-dependent reference signals. That reference signal, which is highly similar to or identical with the measured response signal, allows drawing a conclusion to the current temperature.

In particular, it is proposed for the excitation signal to excite temperature-dependent acoustic surface waves in the temperature sensor, whereby these acoustic surface waves are a part of the response signal, which is transmitted by the temperature sensor. The invention thus utilizes acoustic surface wave sensors, the resonance frequency of which is a function of the current temperature. The acoustic surface wave sensors (SAW sensors) are passive components, which return a part of a received excitation signal by means of an integrated antenna, after the excitation signal has passed through the SAW structure. As a result of the individual embodiment of the component structures, every component has a certain resonance frequency for a certain temperature. The response signals are returned by means of the antenna and can be received by the transmission-receiving device.

It is proposed for a plurality of excitation signals comprising different frequencies of a defined frequency band to be transmitted in succession. The measurement accuracy can be increased as a result of the number of the transmitted excitation signals. It is also advisable to select the transmitted frequencies as a function of the expected current temperatures. The larger the number of the frequencies, which are used in the defined frequency band, the more accurately the determination of the temperature-dependent resonance frequency and thus also the current temperature inside the kitchen appliance or inside the item to be cooked, respectively. It is thereby also advantageous to simultaneously use a plurality of temperature sensors for different temperature ranges. For example, these temperature sensors can be combined within a common temperature probe, wherein said temperature sensors can be positioned linearly above a longitudinal extension of the temperature probe, so that a temperature gradient can be determined between temperatures, which are determined by the temperature sensors, or so that a coldest area inside the item to be cooked can also be determined. It is advantageous thereby for the temperature probe to measure a current temperature of the item to be cooked in any event, without the need to position the temperature probe inside the item to be cooked in a locally accurate manner.

It is furthermore provided that, for determining the current temperature, the signal intensities of the response signals are measured, the response signal having the largest signal intensity is determined therefrom, and that the frequency of this response signal is compared to temperature-dependent resonance frequencies of the temperature sensor. The more response signals are available for this evaluation, the higher the measurement accuracy, with which the current temperature can be determined. Advantageously, the temperature-dependent resonance frequencies of the temperature sensor or of the temperature sensors, respectively, are stored in a table.

According to the invention, the transmission-receiving device transmits at least partial information of the response signal and/or the value of the current temperature to a further kitchen appliance or to an external processor. For this purpose, communication interfaces of the first kitchen appliance as well as of the further kitchen appliance and/or of the external processor are used. On principle, the interface can be a wireless or wired interface, wherein a wireless transmission of the data is particularly comfortable for the user. In particular, the transmission can occur by means of WLAN, Bluetooth or further radio networks.

In a particularly advantageous manner, the external processor or the control device of the further kitchen appliance controls a preparation step of the further kitchen appliance as a function of the determined current temperature. In the first-mentioned case, the external processor works as interconnected control device, so that the further kitchen appliance does not need to control any corresponding method steps.

Finally, provision is also made in addition to the proposed method for measuring a temperature inside a kitchen appliance for a system for carrying out such a method, wherein the system has a kitchen appliance, in particular an electrically operated food processor, comprising a control device for controlling a preparation of an item to be cooked, which is contained in a preparation vessel, and comprising a communication interface for transmitting and/or receiving data, at least one temperature sensor, which can be moved relative to the kitchen appliance, in particular an acoustic surface wave sensor (SAW sensor), as well as at least one transmission-receiving device, which can be moved relative to the kitchen appliance, wherein the temperature sensor can be connected to the kitchen appliance via the transmission-receiving device, and wherein the control device is embodied to control a preparation step of the kitchen appliance as a function of a current temperature, which is transmitted to the control device via the communication interface.

According to the invention, the system has a kitchen appliance, such as, for example, an electrically operated food processor, at least one transmission-receiving device and at least one temperature sensor. The transmission-receiving device as well as the temperature sensor are to be introduced movably and thus in a particularly simple and uncomplicated manner in the desired measuring position relative to the kitchen appliance. The kitchen appliance, that is, for example a cooking mixer, which stands on a work surface, can remain at this position without any changes, while the user brings the temperature sensor to the desired measuring position, for example into a vessel for an item to be cooked, which is filled with an item to be cooked and which is arranged in a different kitchen appliance, for example an oven. Advantageously, the user arranges the transmission-receiving device outside of the kitchen appliance (oven), advantageously in such a manner that the distance between the temperature sensor and the transmission-receiving device still allows for a communication connection between them. In the event that the temperature sensor and the transmission-receiving device communicate with one another, for example by means of a Bluetooth connection, the distance is not to exceed the maximum range of the network. The same applies for the distance between the kitchen appliance and the transmission-receiving device, wherein a WLAN network or a different radio network comprising a similar range is suggested due to the distances, which are larger in practice. In addition, the system can also have an external processor or can communicate with an external processor, which is arranged in communication connection between the kitchen appliance and the transmission-receiving device. The external processor can thereby serve as intermediate station, which can handle a plurality of different tasks, for example signal amplification, display of the measured temperature on a display, evaluation of the response signals or partial information of the response signals.

As a whole, a temperature measurement device is created, which works wirelessly, the temperature sensor of which does not require an active electronics, such as, for example, an accumulator or the like, and which can connect different kitchen appliances to one another in terms of communication. The kitchen appliance, which is part of the system according to the invention (preferably an electrically operated food processor), can coordinate preparation steps for preparing an item to be cooked to a current temperature of the item to be cooked inside the further kitchen appliance. The further kitchen appliance can be an oven, a barbecue, a stove, a pot or the like, for example. Likewise, it is also possible for the further kitchen appliance to be a partial area of the first kitchen appliance, for example a cooking attachment.

The transmission-receiving device is embodied in such a manner that it can be arranged on a kitchen appliance in a particularly simple manner. For example, it can have a hook-shaped end region, which can be hung over a door handle of an oven door or the like. The transmission-receiving device can have an active electronics. Advantageously, it has a rechargeable accumulator, a digital signal processor (DSP), a data memory, a communication module, a charging electronics or the like, for example.

The system can either have only a single transmission-receiving device or a plurality of transmission-receiving devices, wherein, in the case of a plurality of temperature sensors inside the system, each temperature sensor can be assigned its own transmission-receiving device. However, it is advantageous for a plurality of temperature sensors to be assigned to a common transmission-receiving device.

If the system has a plurality of temperature sensors, the latter can be used for different temperature ranges. A plurality of temperature sensors can thereby be combined to form a common temperature probe. In the event that the temperature probe, similar to a probe, has an elongate extension, for example, a plurality of temperature sensors can be arranged linearly above the longitudinal extension thereof. A temperature gradient, among others, inside the temperature probe, and thus also inside the item to be cooked, which is measured with it, can be measured by means of this arrangement, wherein the coldest location can also be recognized at the same time.

To store the temperature probe or separate temperature sensors when not in use, the latter can, for example, be arranged in a recess of the housing of the transmission-receiving device or also in the kitchen appliance or accessories for the kitchen appliance.

It is proposed for the system to have a preparation vessel, which can be arranged in the kitchen appliance, a spatula, which can be arranged in the preparation vessel, a knife set or milk frother, which can be connected to a mixer of the kitchen appliance, or a cooking attachment, which can be connected to the preparation vessel, wherein the temperature sensor is arranged in or on the preparation vessel, the spatula, the knife set, the milk frother and/or the cooking attachment. The preparation vessel, the spatula, the knife set, the milk frother and/or the cooking attachment are thereby accessories in terms of the above-mentioned embodiments. According to this embodiment, the temperature sensor can be moved relative to the kitchen appliance in combination with the afore-mentioned accessories. It is advantageous thereby for the temperature sensor to be automatically positioned on the kitchen appliance by arranging the accessories such that the temperature sensor is arranged in the item to be cooked, which is to be prepared, and can thus measure the current temperature of the item to be cooked. It is advisable for the temperature sensor to be arranged in the mentioned accessories at a location, which comes into contact with the item to be cooked, which is to be prepared, in response to a common use.

The arrangement of the temperature sensor in the preparation vessel, the spatula, the knife set, the milk frother and/or the cooking attachment or further accessories elements can either be reversible or non-reversible. In the first-mentioned reversible case, it is possible to equip the accessories element with a temperature sensor only when a temperature measurement is to be carried out. Otherwise, it is possible, for example, to remove the temperature sensor from the accessories element, so as to be able to clean the accessories element. This relates in particular to the embodiments, in the case of which the temperature sensor is arranged on the outside, for example on the knife set or the milk frother.

Finally, the system can also have a charging device for the accumulator of the transmission-receiving device. The charging device can be arranged on the kitchen appliance, for example, and can have a suitable interface for the charging contacts of the accumulator. Advantageously, a partial area of the transmission-receiving device can be introduced into the charging device so as to correspond to the shape thereof, so that the user of the kitchen appliance can connect charging device and accumulator in a particularly simple manner.

The invention will be explained in more detail below by means of exemplary embodiments.

Figure 2:
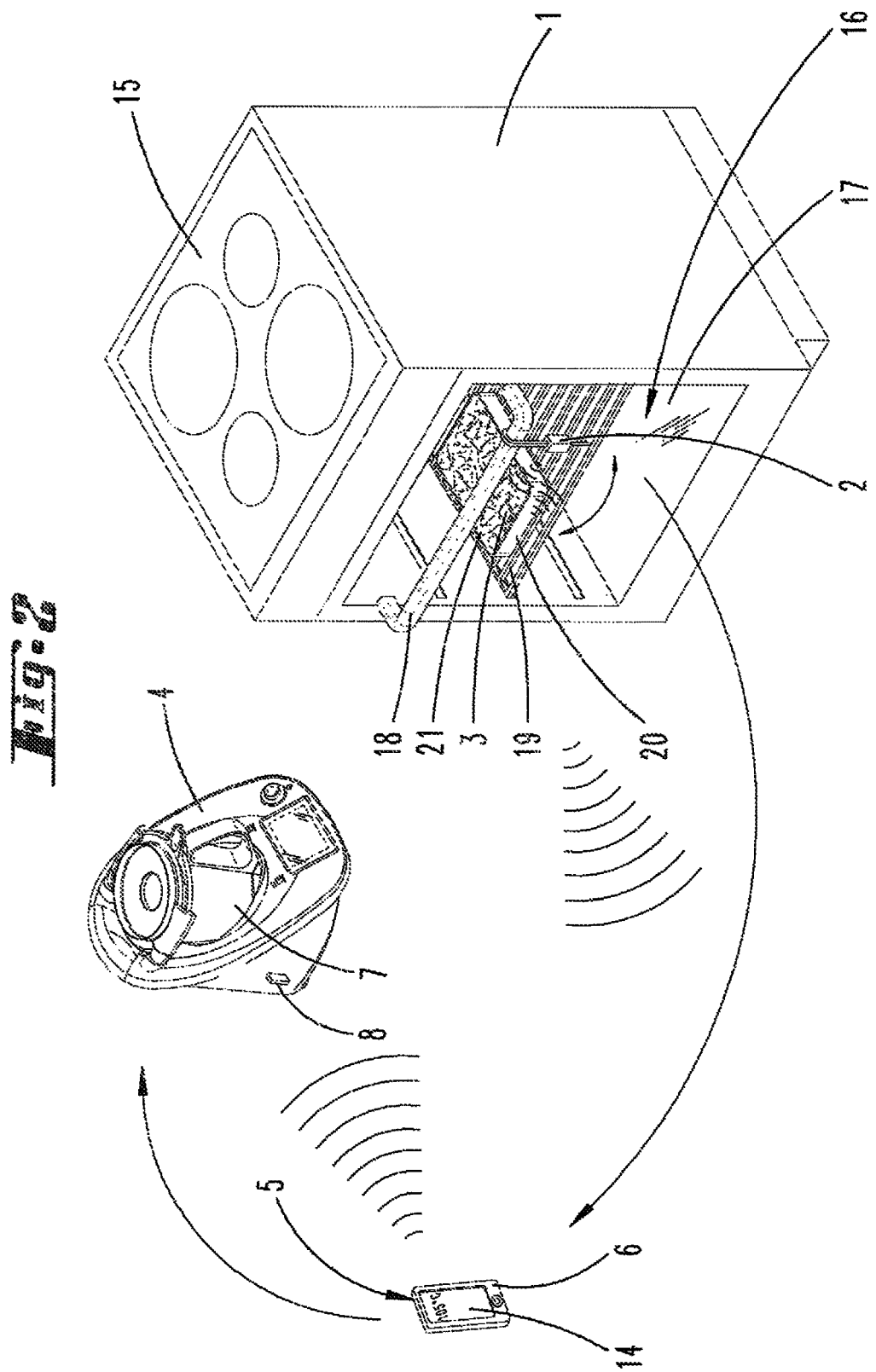
Figure 3:
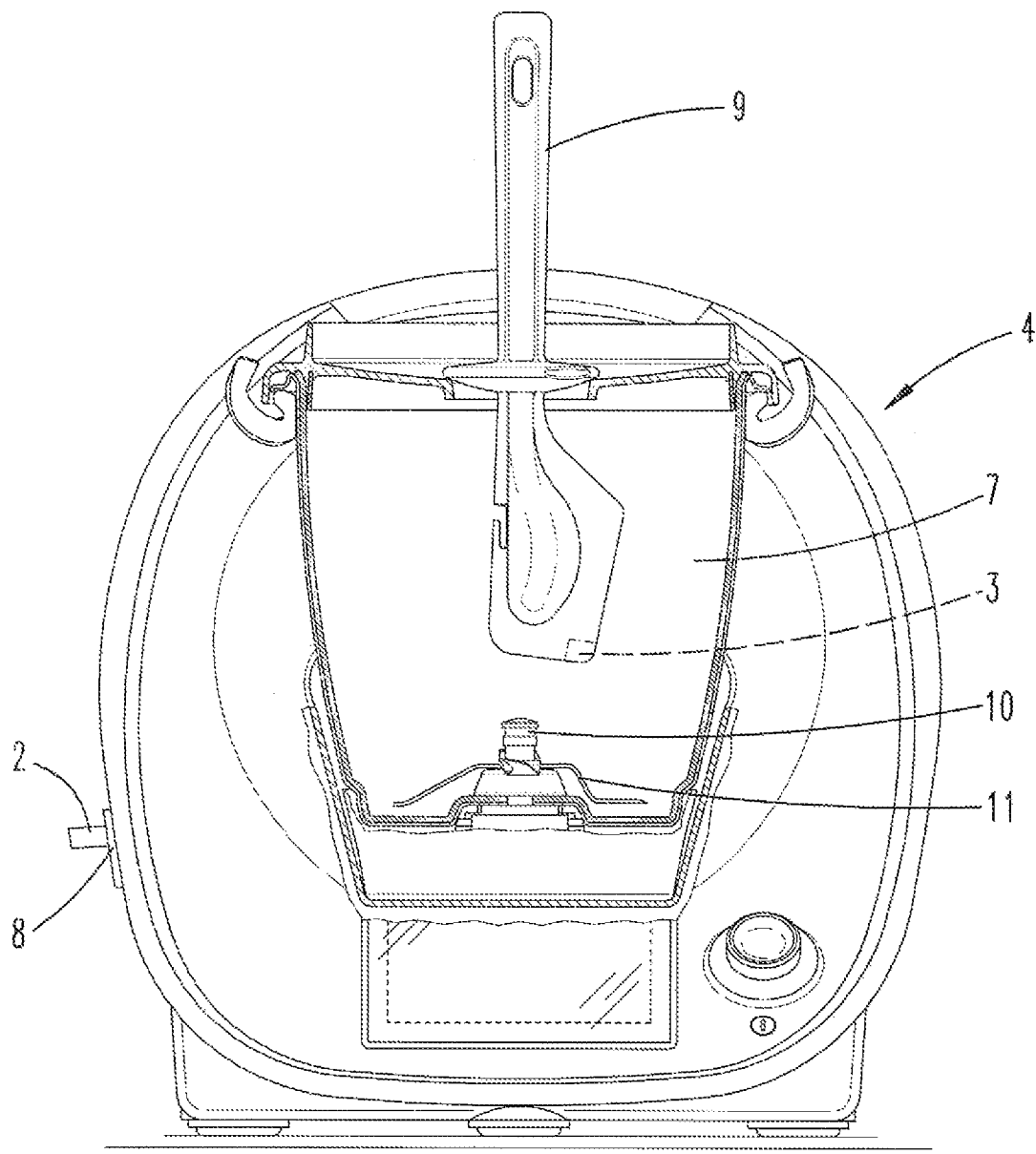
Figure 4:
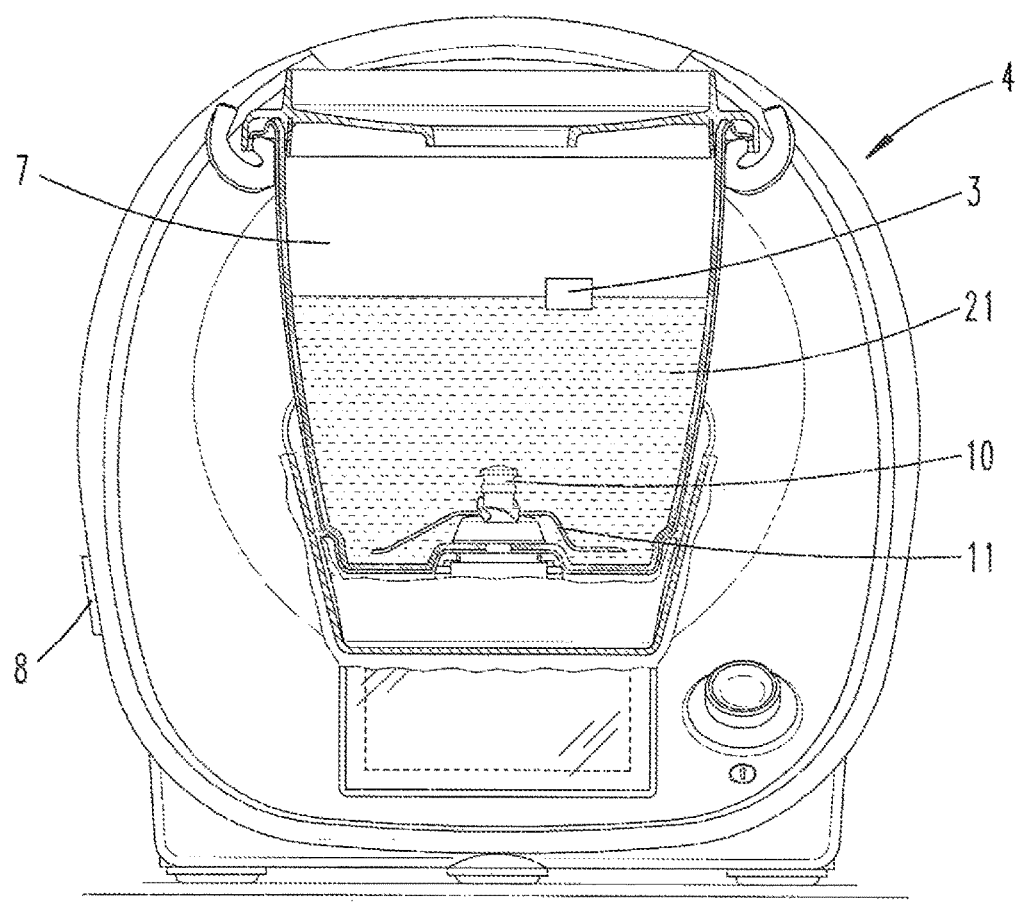
Figure 5:
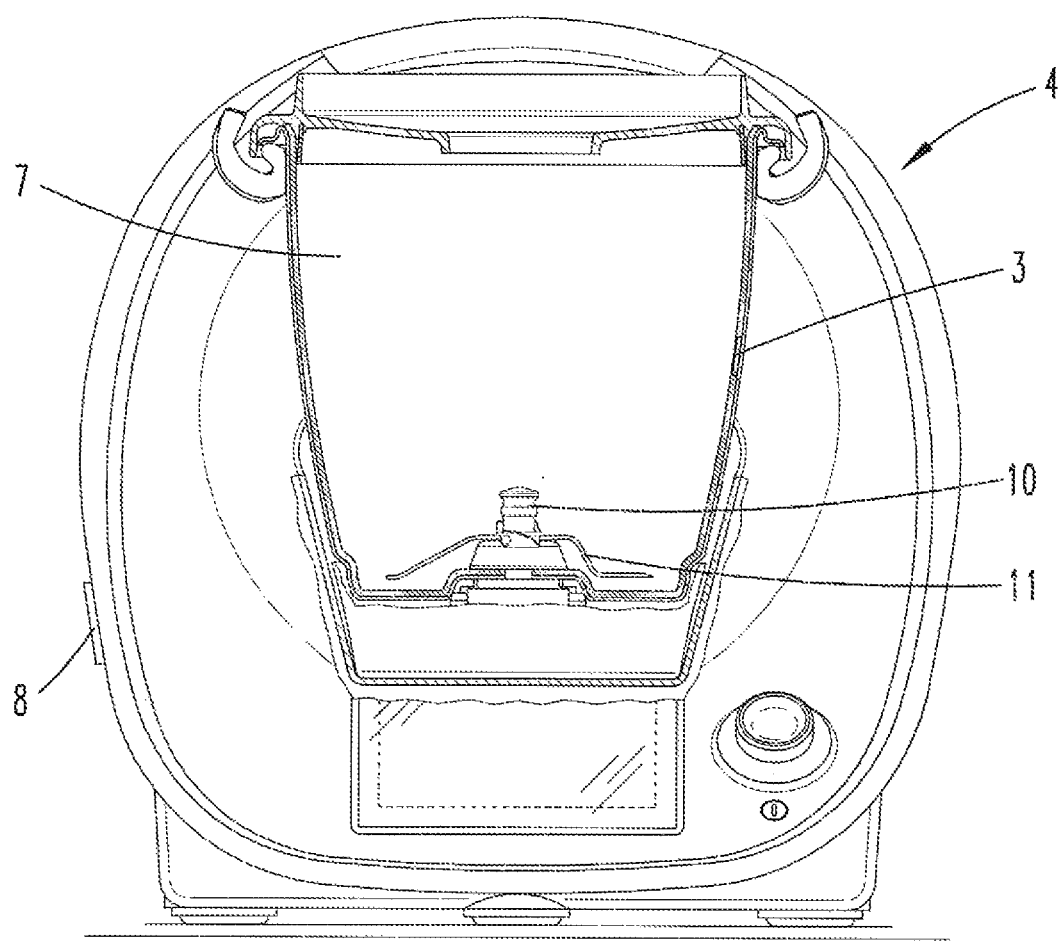
Figure 6:
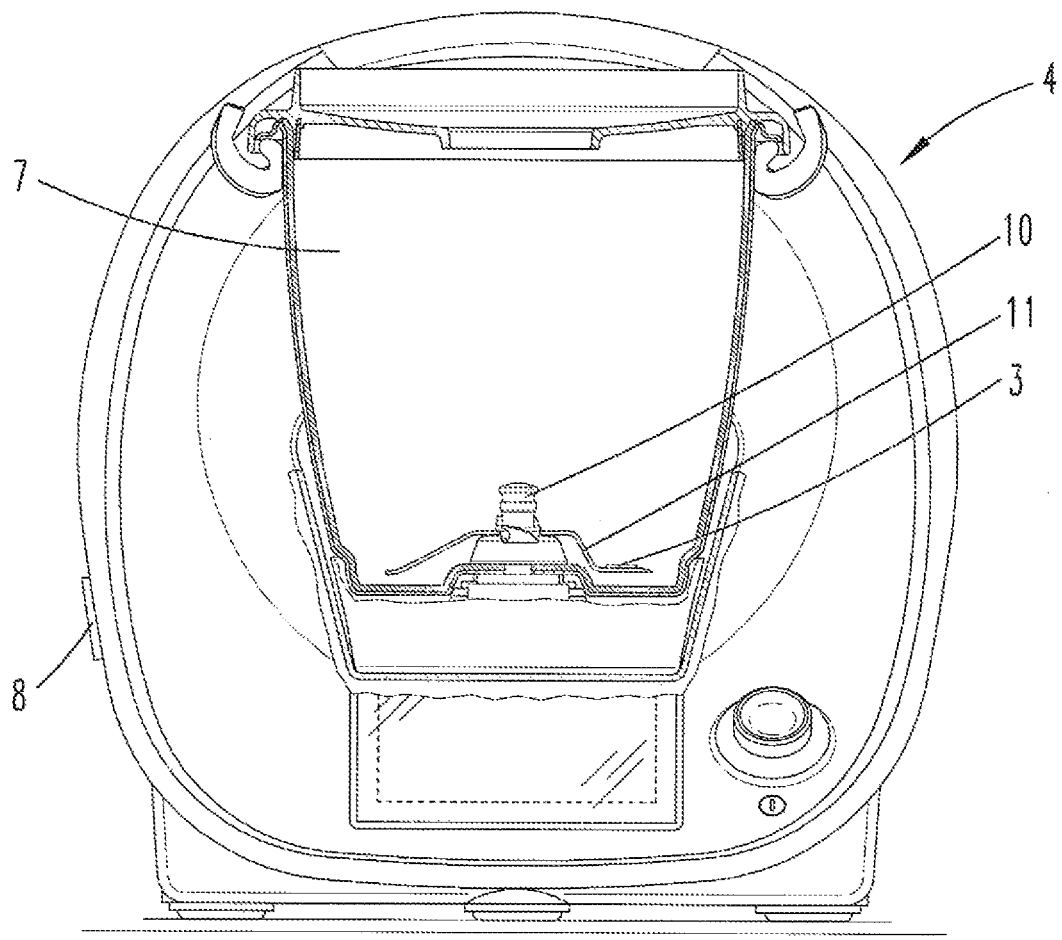
Figure 7:
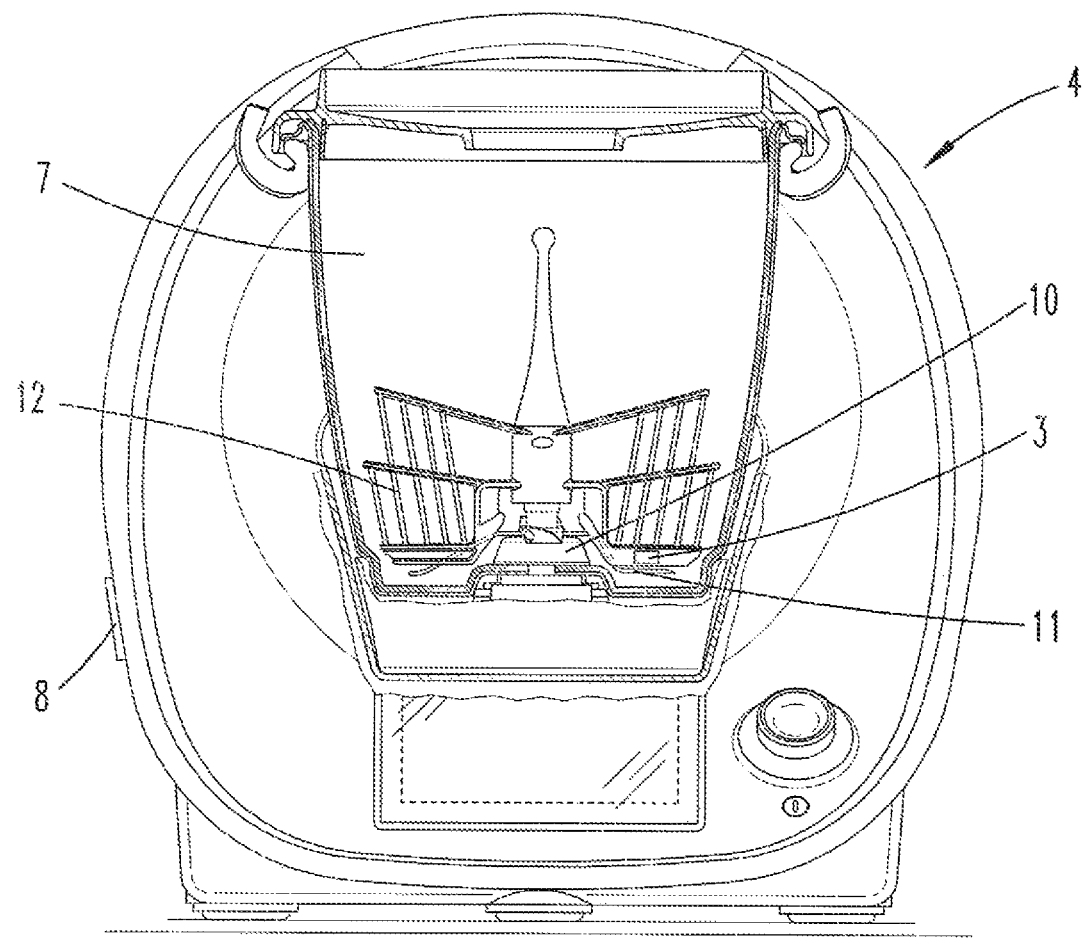
Figure 8:
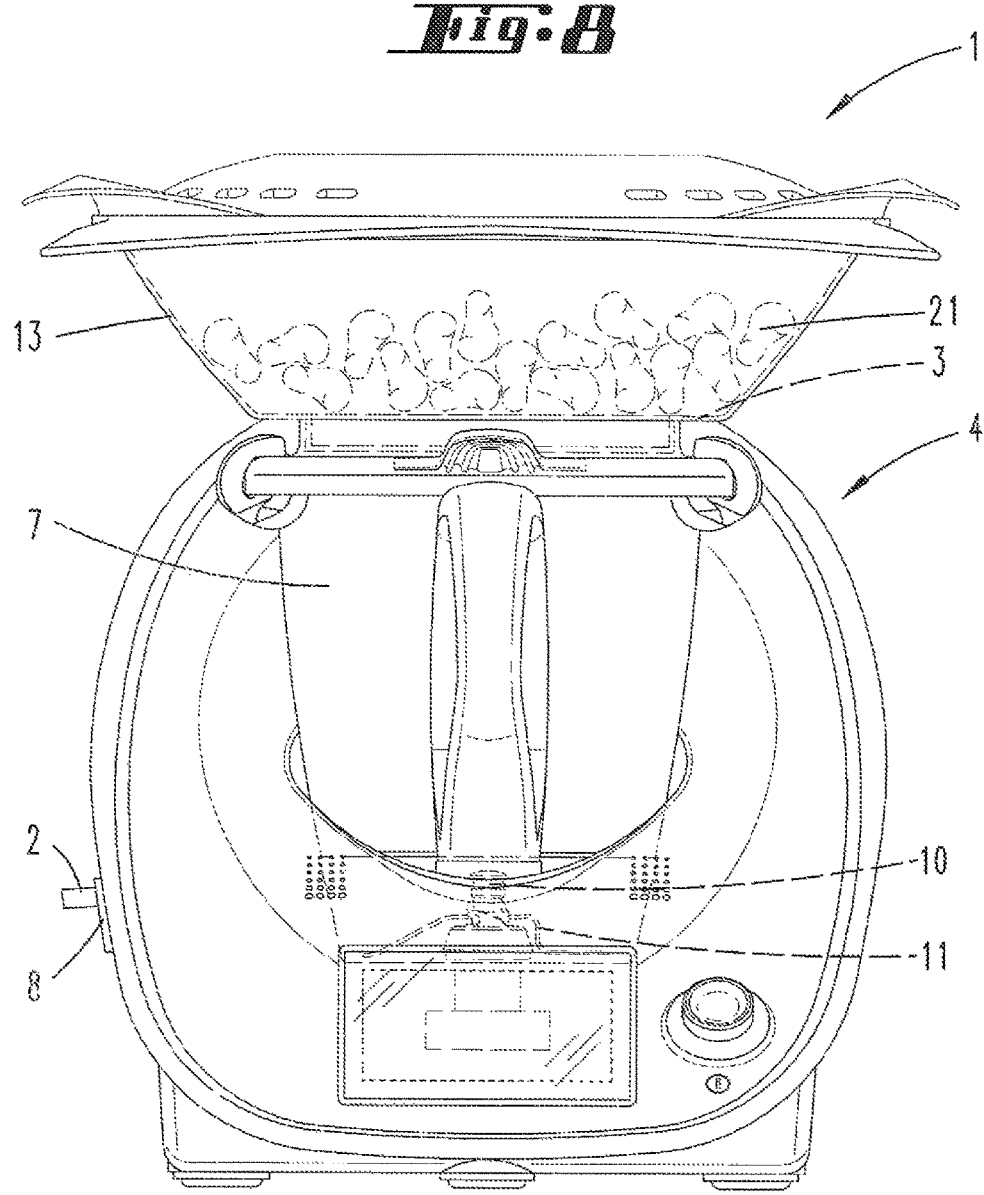
Figure 9:
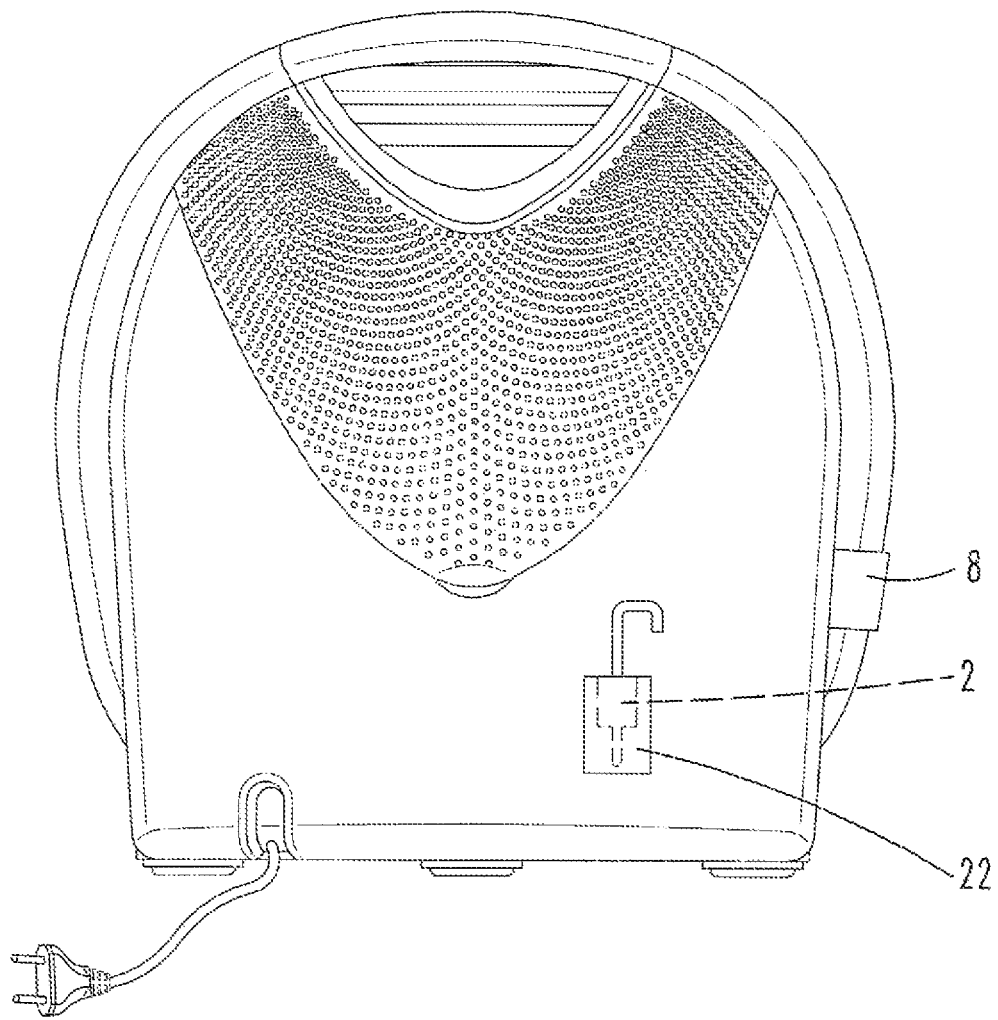

FIG. 1 shows a system according to the invention comprising a kitchen appliance, a transmission-receiving device and a temperature sensor (arranged in a further kitchen appliance), FIG. 2 shows a system according to the invention for temperature measurement according to FIG. 1, but comprising an additional external processor, FIG. 3 shows a kitchen appliance comprising a spatula, which has a temperature sensor, FIG. 4 shows a kitchen appliance comprising a temperature sensor, which swims in a preparation vessel, FIG. 5 shows a kitchen appliance comprising a preparation vessel, which has a temperature sensor, FIG. 6 shows a kitchen appliance comprising a knife set, which has a temperature sensor, FIG. 7 shows a kitchen appliance comprising a milk frother, which has a temperature sensor, FIG. 8 shows a kitchen appliance comprising a cooking attachment, which has a temperature sensor, FIG. 9 shows a kitchen appliance comprising a charging device for a transmission-receiving device.

FIG. 1 shows a kitchen appliance 1, which has a stove 15 and an oven 16. An oven door 17 comprising a door handle 18 is arranged on the kitchen appliance 1. An oven grate 18, which supports a vessel 20 for an item to be cooked, which is filled with an item to be cooked 21, is located in the oven 16.

A temperature sensor 3, which is embodied as surface wave sensor (SAW sensor), is immersed in the item to be cooked 21. A transmission-receiving device 2 is arranged on the door handle 18 of the oven door 17, namely hooked in by means of a hook element. For combination with the temperature sensor 3, the transmission-receiving device 2 has a communication module as well as a further electronics, such as, for example, a digital signal processor, a memory module, an accumulator and a charging electronics for it.

A further kitchen appliance 4, which, according to the exemplary embodiment, is an electrically operated food processor (cooking mixer), is arranged next to the kitchen appliance 1. A preparation vessel 7, in which an item to be cooked 21 can be prepared, is arranged in the kitchen appliance 4. A preparation inside the kitchen appliance 4 can include a heating process and/or a mixing process, for example. The kitchen appliance 4 is furthermore equipped with a communication interface 8, which has a radio module, for example, such as a WLAN module or the like.

The kitchen appliance 4, the transmission-receiving device 2 as well as the temperature sensor 3 together form a system according to the invention for measuring a temperature inside the other kitchen appliance 4, namely here the combination of the oven 16 and the stove 15.

The invention according to this embodiment alternative works in such a manner that the user places the temperature sensor 3 into or on the item to be coked 21, so as to measure the temperature of the item to be cooked 21. He can do this directly following the filling of the item to be cooked 21 into the vessel 20 for the item to be cooked, for example, so that the temperature sensor 3 is already present in the item to be cooked 21 at the beginning of the cooking process. The user places the vessel 20 for the item to be cooked onto an oven grate 19 as usual and pushes it into the oven 16. Then, he closes the oven door 17 and starts the preparation process. The user hooks the transmission-receiving device 2, which can communicate with the temperature sensor 3, to the door handle 18 of the oven door 17.

Even though only one temperature sensor 3 is illustrated in the shown exemplary embodiment, it goes without saying that it is also possible to arrange a plurality of temperature sensors 3 in the item to be cooked 21 or in the oven 16, so as to be able to measure a temperature at different positions. Every temperature sensor 3 can thereby on principle be assigned its own transmission-receiving device 2. It is advantageous, however, that only a single transmission-receiving device 2 can communicate with a plurality of or with all temperature sensors 3, respectively.

In the shown exemplary embodiment, the temperature sensor 3 is a surface wave sensor (SAW sensor), on the surface of which acoustic surface waves can be excited as a function of the temperature. For this purpose, the temperature sensor 3 has a component structure, which has a temperature-dependent resonance frequency, that is, which intensifies a certain frequency as a function of the temperature.

In addition, the user prepares the kitchen appliance 4, namely the food processor—as a function of a recipe, according to which he wants to prepare the item to be cooked 21. For example, the user can fill the preparation vessel 7 of the kitchen appliance 4 with an ingredient, which, after the preparation of the item to be cooked 21 has been concluded, is to be mixed with the latter. For example, provision can be made for the item to be cooked 21 and the ingredient contained inside the preparation vessel 7 of the kitchen appliance 4 to have a certain temperature when being mixed or for them to be heated further together, so that it is advantageous to already preheat the ingredient contained in the preparation vessel 7 prior to reaching the final temperature of the item to be cooked 21 inside the oven 15 or prior to the completed preparation step (at a predetermined temperature).

For example, the measurement of the temperature of the item to be cooked 21 now takes place in such a manner that the transmission-receiving device 2 transmits a plurality of excitation signals comprising frequencies, which differ from one another, of a defined frequency band, in succession. The frequencies match the component structure of the temperature sensor 3 as well as the expected temperatures. For example, the temperature sensor 3 can be matched to an ISM band of 433 MHz. Each of the excitation signals brings about a response signal inside the temperature sensor 3, so that the latter returns a response signal to the transmission-receiving device 2 in accordance with each excitation signal. Due to the fact that not all frequencies are intensified evenly inside the component structure of the temperature sensor 3 as a function of the current temperature of the item to be cooked 21, the current temperature the item to be cooked 21 can be determined from the signal intensity of the response signal. If an excitation signal from the transmission-receiving device 2 corresponds to a resonance frequency of the temperature sensor 3 in the case of a current temperature, the signal intensity of this response signal is higher than the signal intensities of the response signals comprising frequencies, which differ therefrom. The response signals received from the temperature sensor 3 by the transmission-receiving device 2 are stored, for example inside a data memory of the transmission-receiving device 2, and are subsequently evaluated inside a digital signal processor of the transmission-receiving device 2. The response signal comprising the largest signal intensity is determined from the stored response signals and the frequency of this response signal is subsequently compared to temperature-dependent resonance frequencies of the temperature sensor 3. If the response signal comprising the strongest intensity corresponds to a stored resonance frequency, the temperature can be determined reliably. The larger the number of the excitation signals inside the defined frequency band, the more meaningful the measurement result.

The transmission-receiving device 2 subsequently transmits the value of the determined current temperature of the item to be cooked 21 to the other kitchen appliance 1, here the food processor, by means of its communication module, for example a WLAN module. The kitchen appliance 1 receives this information by means of its communication interface 8 and transits it to a control device of the kitchen appliance 1, which controls a preparation step inside the preparation vessel 7 as a function of the temperature. For example, the control device is programmed in such a manner that, in response to a certain temperature of the item to be cooked 21, it activates a heating device of the kitchen appliance 1, so that the ingredient contained inside the preparation vessel 7 is heated up.

If the predetermined temperature has not yet been reached, the above-explained measurement steps are carried out again.

FIG. 2 shows a further exemplary embodiment of the invention, in the case of which an external processor 5, namely the processor 5 of a mobile end device 6, is arranged in communication connection between the transmission-receiving device 2 and the further kitchen appliance 1, namely here the food processor. As illustrated, for example, the mobile end device 6 is a smartphone, but can also be a laptop or the like in the alternative. According to this embodiment alternative, the transmission-receiving device 2 does not communicate directly with the further kitchen appliance 4, but instead with the processor 5 of the mobile end device 6. The invention thereby works in such a manner, for example, that the transmission-receiving device 2 itself does not evaluate the response signals transmitted by the temperature sensor 3, but transmits the response signals or at least relevant partial information of the response signals to the processor 5 of the mobile end device 6. The evaluation then occurs inside the processor 5 of the mobile end device 6. It is possible, for example, for the response signals to not be stored at all in a memory module of the transmission-receiving device 2 any longer, but to only be transferred to the mobile end device 6. According to a further embodiment alternative, however, it is also possible in the alternative for the response signals to be stored inside the memory module of the transmission-receiving device 2 and for a partial evaluation to occur inside the digital signal processor of the transmission-receiving device 2. For example, the evaluation can include that the response signal comprising the largest signal intensity is determined from a plurality of response signals of the defined frequency band. This partial information can then be transmitted by means of the transmission-receiving device 2 to the processor 5 of the mobile end device 6, which subsequently takes over the further evaluation. The further evaluation thereby includes for the frequency of this response signal to be compared with temperature-dependent resonance frequencies of the temperature sensor 3, which are stored inside a data memory of the mobile end device 6. If the frequency corresponds to one of the stored resonance frequencies, a conclusion can be drawn to the current temperature of the item to be cooked 21. The external processor 5 of the mobile end device 6 then controls the kitchen appliance 4 in such a manner that a corresponding preparation step is controlled inside the further kitchen appliance 4.

FIGS. 3 to 8 show different possibilities for positioning a temperature sensor 3 for measuring a temperature of an item to be cooked 21. In the shown exemplary embodiments, the temperature sensor 3 is arranged in a kitchen appliance 4, which is embodied here as an electrically operated cooking mixer. The current temperature measured in the kitchen appliance 4 can be used to control a preparation step in the same kitchen appliance 4 or also in a different kitchen appliance 1, for example in a further food processor or an oven 16, stove 15 or the like. On principle, a plurality of different kitchen appliances 1, 4 in terms of the invention can be combined. It is significant for them to be compatible with the system according to the invention for measuring a temperature, so that preparation steps inside a first kitchen appliance 1, 4 can be coordinated with preparation steps inside a different kitchen appliance 1. 4.

FIG. 3 shows a spatula 9, on which a temperature sensor 3 is arranged. The temperature sensor 3 is thereby embedded into the material of the spatula 9, so that said spatula does not come into direct contract with a food, which is contained in the preparation vessel 7. Advantageously, the spatula 9 has a heat-guiding material, so that the temperature of the food contained inside the preparation vessel 7 is transferred to the temperature sensor 3. In the alternative, it is also possible, on principle, to attach the temperature sensor 3 on the outside of the surface of the spatula 9. It is thereby advisable for the temperature sensor 3 to be arranged on the spatula 9 so as to be removable, so that said temperature sensor 3 is not obstructive when cleaning the spatula 9. The kitchen appliance 4 furthermore has a communication interface 8, to which a transmission-receiving device 2 is connected. The connection can either occur wirelessly, in that the transmission-receiving device 2 is not in physical contact with the communication interface 8. In the alternative however—as shown in the figure—it is also possible for the transmission-receiving device 2 to have a closure, which corresponds to the communication interface 8, so that the transmission-receiving device 2 can be inserted into the communication interface 8 of the kitchen appliance 4. Moreover, the measurement of the current temperature occurs by means of the temperature sensor 3, as described above with reference to FIGS. 1 and 2.

FIG. 4 shows a temperature sensor 3, which swims inside the preparation vessel 7 of the kitchen appliance 4 on or in an item to be cooked 21, which is to be prepared, respectively. The item to be cooked 21 can be a soup, a stew or the like, for example. Advantageously, the temperature sensor 3 is embodied as floater, which has a watertight housing, which has a surface, which is as large as possible and which is in contact with the item to be cooked 21. The temperature sensor 3 is in communication connection with a non-illustrated transmission-receiving device 2, which, for example, as illustrated in FIG. 3, can be in communication connection with the communication interface 8 of the same kitchen appliance 4 or also of a further kitchen appliance 1.

FIG. 5 shows a kitchen appliance 4 comprising a preparation vessel 7, in the wall of which a temperature sensor 3 is arranged. The temperature sensor 3 is embedded in the wall of the preparation vessel 7, so that no edges or protrusions extend into the preparation vessel 7. Moreover, the above explanations apply.

FIG. 6 shows a temperature sensor 3, which is arranged on a knife set 11. The knife set 11 is connected to a mixer 10 of the kitchen appliance 4. The temperature sensor 3 can be adhered, welded, or permanently or removably connected in a different manner to the knife set 11.

FIG. 7 shows a temperature sensor 3, which is arranged in a milk frother 12. The milk frother 12 is attached to a knife set 11, which, in turn, is connected to the mixer 10 of the kitchen appliance 4. The temperature sensor 3 is embedded into the material of the milk frother 12.

FIG. 8 shows a kitchen appliance 4 comprising a preparation vessel 7, to which a cooking attachment 13 is attached as further cooking appliance 1. An item to be cooked 21, which is contained in the cooking attachment 13, can be cooked by means of the steam, which is generated in the preparation vessel 7. Steam thereby flows from the preparation vessel 7 into the cooking attachment 13 and permeates the item to be cooked 21, which is contained therein. A temperature sensor 3 is arranged in a wall of the cooking attachment 13, in particular embedded into the material of the wall. A transmission-receiving device 2, which is connected to a communication interface 8 of the kitchen appliance 4, transmits excitation signals to the temperature sensor 3, which responds to them with response signals. The transmission-receiving device 2 receives these response signals and transmits them via the communication interface 8 to a control and evaluation device of the kitchen appliance 4, which evaluates the response signals and which controls the temperature, for example, of a heating device, which is assigned to the preparation vessel 7, accordingly. A control circuit for cooking the item to be cooked 21, which is contained in the cooking attachment 13, at a constant temperature, can thus be created in a particularly advantageous manner. If the temperature sensor 3 measures a decrease of the temperature inside the cooking attachment 13, for example, the heating device of the preparation vessel 7 is controlled such that more steam is generated inside the preparation vessel 7.

Finally, FIG. 9 shows a rear side of a kitchen appliance 4, on which a charging device 22 for recharging the accumulator of a transmission-receiving device 2 is arranged. The charging device 22 is embodied in such a manner that the transmission-receiving device 2 can at least partially be introduced therein. A holder for the transmission-receiving device 2, which corresponds to the shape thereof, which is particularly comfortable for the user of the kitchen appliance 4, is particularly advisable.

LIST OF REFERENCE NUMERALS 1 kitchen appliance
2 transmission-receiving device
3 temperature sensor
4 kitchen appliance
5 processor
6 mobile end device
7 preparation vessel
8 communication interface
9 spatula
10 mixer
11 knife set
12 milk frother
13 cooking attachment
14 display
15 stove
16 oven
17 oven door
18 door handle
19 oven grate
20 vessel for item to be cooked
21 item to be cooked
22 charging device

The invention claimed is:

1. A method for measuring a temperature of an item inside a first kitchen appliance, wherein the item is to be prepared inside the first kitchen appliance, comprising the method steps:
placing a temperature sensor in the first kitchen appliance,
connecting a transmission-receiving device diplaceable relative to the first kitchen appliance,
transmitting an electromagnetic excitation signal by means of the transmission-receiving device,
receiving the excitation signal by the temperature sensor, which is arranged in the first kitchen appliance,
transmitting a temperature-dependent response signal by the temperature sensor,
receiving the response signal by the transmission-receiving device,
wherein the transmission-receiving device transmits the response signal or partial information of the response signal to a control device of a second kitchen appliance or to an external processor, and
wherein the control device of the second kitchen appliance or the external processor determines the current temperature by comparing the response signal to temperature-dependent reference signals.

2. The method according to claim 1, wherein the response signal excites temperature-dependent acoustic surface waves (SAW), which are a part of the response signal, in the temperature sensor.

3. The method according to claim 1, wherein a plurality of excitation signals comprising different frequencies of a defined frequency band are transmitted in succession.

4. The method according to claim 3, wherein for determining the current temperature, the signal intensities of the response signals are measured, the response signal having the largest signal intensity is determined therefrom, and the frequency of this response signal is compared to temperature-dependent resonance frequencies of the temperature sensor.

5. The method according to claim 1, wherein the current temperature is determined at least partially inside the first kitchen appliance and/or inside the second kitchen appliance and/or inside the external processor.

6. The method according to claim 1, wherein the second kitchen appliance is an electrically operated food processor.

7. The method according to claim 1, wherein the external processor is a processor of a mobile end device.

8. The method according to claim 1, wherein the external processor or the control device of the second kitchen appliance controls a preparation step of the second kitchen appliance as a function of the determined current temperature.

9. A system for carrying out a method according to claim 1, said system having a second kitchen appliance, comprising a control device for controlling a preparation of an item to be cooked, which is contained in a preparation vessel, and comprising a communication interface for transmitting and/or receiving data, at least one temperature sensor, which can be moved relative to the second kitchen appliance, as well as at least one transmission-receiving device, which can be moved relative to the second kitchen appliance, wherein the temperature sensor can be connected to the second kitchen appliance via the transmission-receiving device, and wherein the control device is embodied to control a preparation step of the second kitchen appliance as a function of a current temperature, inside a first kitchen appliance, and wherein the transmission-receiving device is built to transmit a response signal or partial information of the response signal of the temperature sensor to the control device of the second kitchen appliance or to an external processor, and wherein the control device of the second kitchen appliance or the external processor is built to determine the current temperature by comparing the response signal to temperature-dependent reference signals.

10. The system according to claim 9, wherein the system additionally has a preparation vessel, which can be arranged in the second kitchen appliance, a spatula, which can be arranged in the preparation vessel, a knife set or milk frother, which can be connected to a mixer of the second kitchen appliance, or a cooking attachment, which can be connected to the preparation vessel, wherein the temperature sensor is arranged in or on the preparation vessel, the spatula the knife set, the milk frother and/or the cooking attachment.

* * * * *